(12) United States Patent
Broderick et al.

(10) Patent No.: US 7,083,278 B2
(45) Date of Patent: Aug. 1, 2006

(54) METHOD AND SYSTEM FOR ORDERING CUSTOMIZED COSMETIC CONTACT LENSES

(75) Inventors: Daniel F. Broderick, La Jolla, CA (US); Ann T. Foppe, Elmhurst, IL (US); James Santilli, Oak Park, IL (US); Robert Carey Tucker, Arlington Heights, IL (US)

(73) Assignee: Novartis AG, Basel (CH)

( * ) Notice: Subject to any disclaimer, the term of this patent is extended or adjusted under 35 U.S.C. 154(b) by 91 days.

(21) Appl. No.: 10/792,205

(22) Filed: Mar. 3, 2004

(65) Prior Publication Data

US 2004/0176977 A1 Sep. 9, 2004

Related U.S. Application Data

(62) Division of application No. 10/040,106, filed on Oct. 24, 2001, now Pat. No. 6,746,120.

(60) Provisional application No. 60/244,253, filed on Oct. 30, 2000.

(51) Int. Cl.
*G02C 7/02* (2006.01)

(52) U.S. Cl. .................. 351/177; 351/160 R; 351/162

(58) Field of Classification Search ................ 351/177
See application file for complete search history.

(56) References Cited

U.S. PATENT DOCUMENTS

| | | | | |
|---|---|---|---|---|
| 6,095,650 A | * | 8/2000 | Gao et al. | 351/227 |
| 6,488,376 B1 | * | 12/2002 | Streibig | 351/162 |
| 6,499,843 B1 | * | 12/2002 | Cox et al. | 351/246 |
| 6,944,327 B1 | * | 9/2005 | Soatto | 382/154 |

* cited by examiner

*Primary Examiner*—Jordan M. Schwartz
*Assistant Examiner*—Jessica Stultz
(74) *Attorney, Agent, or Firm*—Jian Zhou

(57) ABSTRACT

A method of configuring and ordering a customized contact lens for a user. The method includes the steps of displaying a template eye image to assist the user in visualizing selected options for a customized contact lens, and displaying a plurality of contact lens selection options to the user. The information includes a plurality of selectable lens colors and lens design patterns. The method also includes the steps of sending an ordering request to order a contact lens incorporating lens colors and lens design patterns selected by the user, receiving the ordering request, and manufacturing a contact lens incorporating the lens colors and lens design patterns selected by the user.

4 Claims, 14 Drawing Sheets

METHOD AND SYSTEM FOR ORDERING CUSTOMIZED COSMETIC CONTACT LENSES

This application is a division of U.S. patent application Ser. No. 10/040,106, filed Oct. 24, 2001 now U.S. Pat. No. 6,746,120, which claims benefit under 35 U.S.C. §119(e) of U.S. provisional patent application No. 60/244,253, filed on Oct. 30, 2000, whose disclosures are incorporated herein by reference in its entirety.

FIELD OF THE INVENTION

The present invention relates to contact lens fabrication. In particular, the invention relates to an automated method and system for providing customized cosmetic contact lenses to users.

BACKGROUND OF THE INVENTION

Colored cosmetic contact lenses blend, enhance, or mask the colored portion of the wearer's iris to change the visible color of the eye. Such lenses have become widely accepted fashion accessories, and are even worn by users who do not require prescription correction of their vision. In fact, such lenses may be used to add detail to clothing outfits and other fashions such as Halloween costumes.

Contact lenses recently have been manufactured with improved pattern and color integration that greatly enhances the realism of the resulting colored iris. For example, subtle color differences may be implemented in multiple, superimposed pattern layers on the lens. This gives the iris the illusion of depth of color and improved integration with the wearer's natural eye colors.

While improved technology has resulted in more realistic colors in lenses, there has been an increased demand for a wider variety of colored contact lenses to more accurately reflect the mood, personality or individual tastes of the wearer. This is reflected in the increased popularity of "Tattoo" styled lenses that include printed images on the iris portion. For example, some tattoo lenses have included an inscription such as the text "2000" annularly printed on the iris portion of a lens. Other such lenses have included even opaque iris portions that mask out a portion of the iris so that the pupil of the eye appears to have a vertical ellipsoid shape to suggest the iris of a cat.

Thus, users of prescription contact lenses—or colored-lens wearers who desire more unique and tailored fashion accessories—would benefit from the ability to easily customize cosmetic or corrective contact lenses to suit the individual's tastes. Furthermore, the ability to customize contact lenses may provide a wider market for potential colored contact lens wearers who are unsatisfied with the color options presently available.

Typically, a contact lens must fit the size and shape of the user's eye precisely in order for the lens to be safe to wear. Because of this, contact lenses are typically manufactured in a wide array of sizes and corrective prescriptions to accommodate a majority of wearers. For example, the main parameters for selecting a contact lens for a user includes the lens diameter, the base curve of the lens and the corrective prescription. The corrective prescription can include other parameters, such as the amount of corrective magnification to compensate for myopic or hyperopic vision, the degree of correction needed for astigmatism, the presence or absence of bifocal or trifocal areas, or vision-correcting tinting. Other options, as mentioned above, include iris colorization patterns or other forms of tinting for cosmetic use or convenience in handling. Consequently, the large number of permutations and combinations of these features requires a lens-care practitioner to keep a large inventory of lenses on hand. The least-used lens permutation combinations are likely to remain unused within this inventory.

Similarly, while a wide range of cosmetic color and pattern combinations are available in pre-made packages of contact lenses, the colors and patterns may not be ideally suited for a particular wearer. For example, the skin color, hair color, and iris color of a particular user may appear most cosmetically appealing when accentuated by colored contact lenses having a particular color shade. While multiple shades of colors are available in pre-made stock lenses, the user may be required to settle for a close match of the desired shade instead of an ideal shade if the ideal shade lies somewhere between available successive shade gradients. Moreover, corrective prescriptions such as corrective magnification are available only in stepped increments. For example, magnification is usually available in increments of + or −0.25 diopter. A patient requiring correction of −2.35 diopter would need to choose between the inexact correction of either a −2.25 and −2.50 diopter lens.

While the advent of the Internet and its many implemented software routines have greatly increased consumers' ability to purchase lenses from a wider variety of manufacturers, lens wearers' choices are still restricted by the limitations of pre-manufactured lenses.

SUMMARY OF THE INVENTION

The method and system of the present invention allows users to efficiently order uniquely made customized contact lenses. The method and system may be completely or partially automated, or implemented on a web server and client environment on the Internet.

The invention preferably utilizes customized template images showing the shape, color and surrounding features of a user's actual eye so that the user's selected lens parameters may be reviewed accurately before an order is placed. The template eye images are preferably obtained by photographic means or by scanning the patient's eyes. Furthermore, required parameters, such as corrective prescription, lens diameter and base curve of the lens may be obtained automatically from a confidential database or through communications with an approved optometrist or eye care provider. These parameters may be incorporated into the template.

The user's selected lens parameters include an available palette of iris patterns for use in overlapping, layered arrangements. Other parameters include a wide array of colors for use with or without the patterns. The user may also preferably incorporate computer images or other image information into a customized lens iris area. The user may preview how the lens will look on the wearer's eye after each selection compare all selections at one time, or compare the natural eye colors and construct an arrangement that suits the wearer's needs, both cosmetically and medically.

In one aspect of the present invention, a method of configuring a customized contact lens for a user is provided. The method includes the steps of displaying a template eye image to assist the user in visualizing selected options for a customized contact lens and displaying a plurality of contact lens selection options to the user. The information includes a plurality of selectable lens colors and lens design patterns. The method also includes the step of sending an ordering request to order a contact lens. In another embodiment, the lens may incorporate lens colors and lens design patterns selected by the user, and the method further may include the steps of receiving the ordering request and manufacturing a contact lens incorporating the selected lens colors and lens design patterns.

In another aspect of the present invention, the method may include the steps of providing a choice of sample eyes for selection by the user as a modeling template, selecting one or more sample eyes as a template eye, selecting a pre-configured pattern for superposition onto a portion of the template eye, selecting one or more colors from a pallete of colors for superposition onto coloring of the selected pattern, and adjusting the pattern and colors to generate an image of a contact lens in accordance with the user's selections.

In another aspect of the present invention, a method may be provided that includes the steps of displaying a template eye, allowing the user to modify the appearance of the eye, and deriving a contact lens pattern that, when worn, modifies the appearance of an eye according to the intentions of the user.

In yet another aspect of the present invention, a method of configuring a customized contact lens for a user is provided wherein the user is linked to a computer network interface. The method includes the steps of providing a plurality of sample eye templates for selection by the user via the computer network interface, receiving a request from the user indicating selection of at least one of the eye templates, providing the user with a plurality of available colors for incorporation into a portion of the selected template, receiving a request from the user indicating selection of at least one of the colors, and providing the user with an image of the selected eye template incorporating at least one selected color. After receiving a request from the user to order at least one contact lens made in accordance with the image and the template, the method forwards information relating to the image for fabrication of a contact lens made in accordance with the image and the template.

The method may also provide recommendations of suitable or cosmetically attractive content lenses to the user in accordance with the person's facial characteristics or estimated cosmetic effect of the lens.

The invention may also be embodied in a system for configuring a customized contact lens for a user. The system includes means for displaying a template eye image to assist the user in visualizing selected options for a customized contact lens, and means for displaying a plurality of contact lens selection options to the user on the display. Preferably, this information includes a plurality of selectable lens parameters. Means for sending a request to order a contact lens incorporating lens characteristics selected by the user are also included, together with means for receiving the ordering request and means for manufacturing a contact lens incorporating the characteristics selected by the user.

The invention may further be embodied in a system including an image input device for obtaining a graphical template eye image from the user, and a graphical user display in communication with the device for visualizing the template eye image. The user display preferably displays one or more selectable lens characteristics in conjunction with the template eye image. A user interface is linked to the display for selecting one or more of the selectable lens characteristics for display, and a server in communication with the user interface is also provided. The server receives selections of the lens characteristics from the user interface and incorporates selected ones of the lens characteristics into a modified template eye image. A database accessible by the server containing information relating to the user and the available selectable lens characteristics is provided, along with a fabrication system in communication with the server for receiving information relating to the modified template eye image and manufacturing a contact lens based on the information.

As described in more detail herein, the invention includes the implementation incorporating World Wide Web—enabled search facilitators to assist users in compiling and utilizing widely available information from the Internet. Such implementations include intelligent agents, bots and other user assistants.

In another aspect of the invention, a method is provided for tracking consumer preferences for contact lenses. The method includes the steps of monitoring the activity of at least one customer, and predicting the future purchasing behavior of consumers based on such activity. Intelligent agents or mobile software bots may be employed to track these customer preferences.

In another aspect of the invention, a method may be provided of using an intelligent agent to purchase a contact lens over a computer network. The intelligent agent may perform one or more tasks, including receiving one or more requirements related to a contact lens, searching a computer network for one or more sources of a contact lenses which satisfies one or more of the consumer's requirements, and presenting the results of a search to the consumer.

In yet another aspect of the invention, a method is provided of performing a computer-based online purchase of a contact lens. In this method, a client's computer issues a request and at least one server computer serves the request. Preferably, an intelligent agent performs the steps of searching the computer network for a contact lens having a set of specifications relating to the request, searching for additional contact lenses having that set of specifications, comparing the prices of contact lenses found in the searches, and informing the client computer of the contact lenses available and the associated prices found in the searches.

In another aspect of the invention, a method of informing a customer or potential customer of contact lenses of the availability of a desired lens is provided. The method includes the steps of monitoring the web site activity of the customer, and sending a message to the customer when the customer views a web site that relates to contact lenses.

In yet another aspect of the invention, a method of using an intelligent agent to identify fashion trends is provided. The method includes the steps of searching one or more computer networks and identifying new products for sale on the network. The intelligent agent then recognizes new product trends based on the identifications made and presents these trends to a user.

In another aspect of the invention, a method of employing an intelligent agent to recommend a cosmetic contact lens is provided. The method includes the steps of assessing data relating to a person's facial characteristics and accessing a file including information relating to types of cosmetic contact lenses. Then, the person's facial characteristics are incorporated into a recommendation for a cosmetic contact lens, and a recommendation is made to the person.

Advantages of the present invention will become readily apparent to those skilled in the art from the following description of the preferred embodiments of the invention which have been shown and described by way of illustration. As will be realized, the invention is capable of other and different embodiments, and its details are capable of modifications in various respects. Accordingly, the drawings and description are to be regarded as illustrative in nature, and not as restrictive.

DETAILED DESCRIPTION OF THE PREFERRED EMBODIMENTS OF THE INVENTION

I. Cosmetic Contact Lens Configurations

A. Printed Patterns

The present invention relates to the ordering and manufacture of prescription contact lenses. Contact lenses made in accordance with preferred embodiments of the invention disclosed may be manufactured as shown in Knapp U.S. Pat. No. 4,582,402, which is incorporated herein by reference. The '402 patent discloses prior art colored hydrophilic contact lenses.

Figure 1:
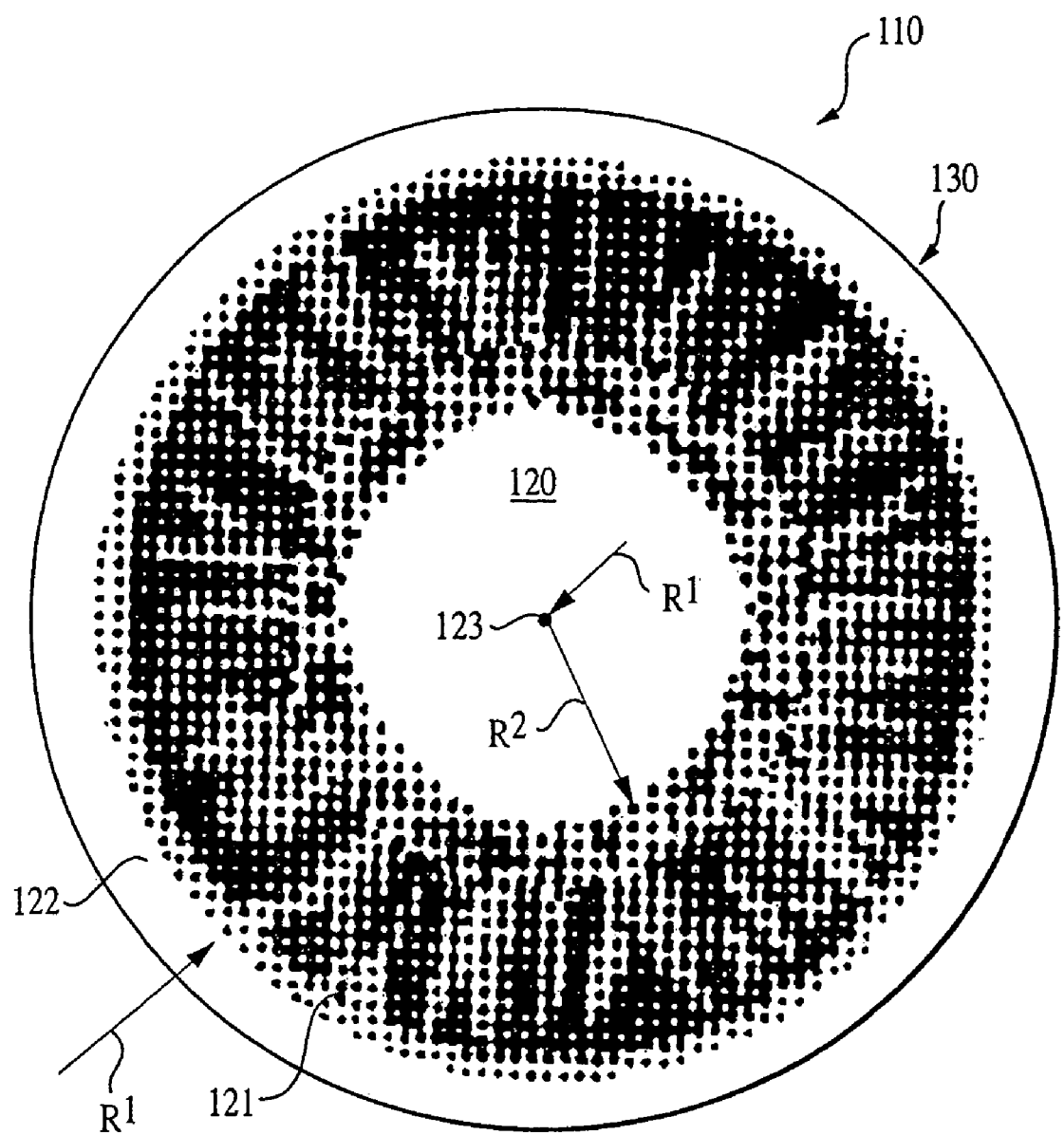
FIG. 1 illustrates a contact lens having a dotted color pattern similar to that shown in the prior art.

As shown in FIG. 1, a prior art contact lens 110 includes a non-opaque pupil section 120 in the center of the lens 110. An annular iris section 121 surrounds the pupil section 20. For most hydrophilic contact lenses, a peripheral rim section 122 surrounds the iris section 121. In colored contact lenses, a colored, opaque, intermittent pattern is printed on the iris section 121, as shown. The non-opaque or clear areas of the iris section 121 appear white in FIG. 1. The single-layered pattern elements shown in the prior art of preferably overlapping dots are printed onto the contact lens 110. The density and sizes of the dots vary depending on their location relative to border areas such as the iris area 121 or the peripheral rim section 122.

B. Overlapping Patterns

While the above patterns shown in FIG. 1 have been used on colored contact lenses that appear to change the visible color of the wearer's iris, a more natural-looking and cosmetically acceptable iris color results when the lens incorporates multiple layers of irregular printed patterns having varying or contrasting color shades. The combination of these pattern overlays results in a coloring effect having depth, which is closer to the natural look of the human iris.

Figure 2:
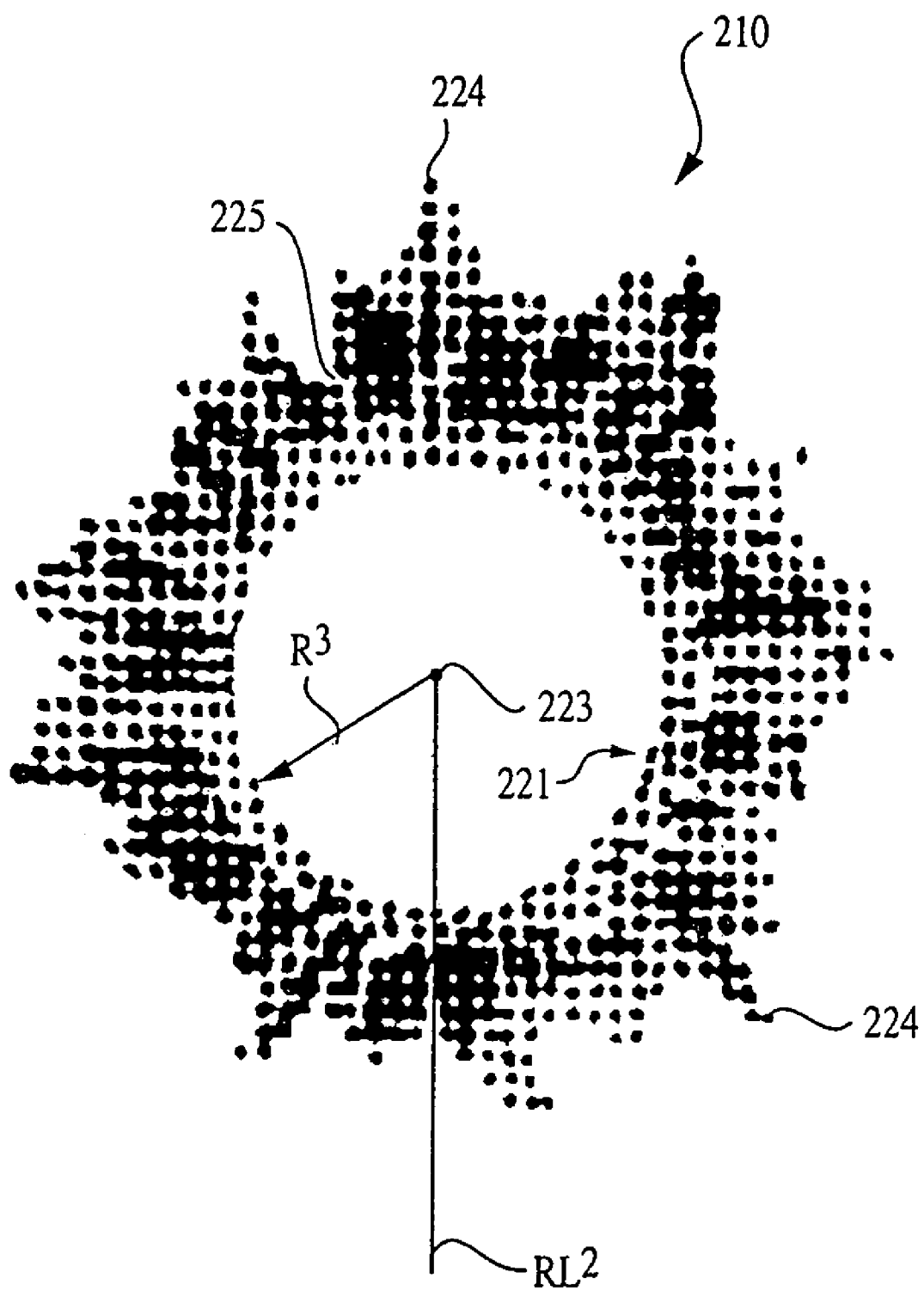
FIG. 2 illustrates a prior art color pattern overlay for a contact lens for an inner iris portion.
Figure 3:
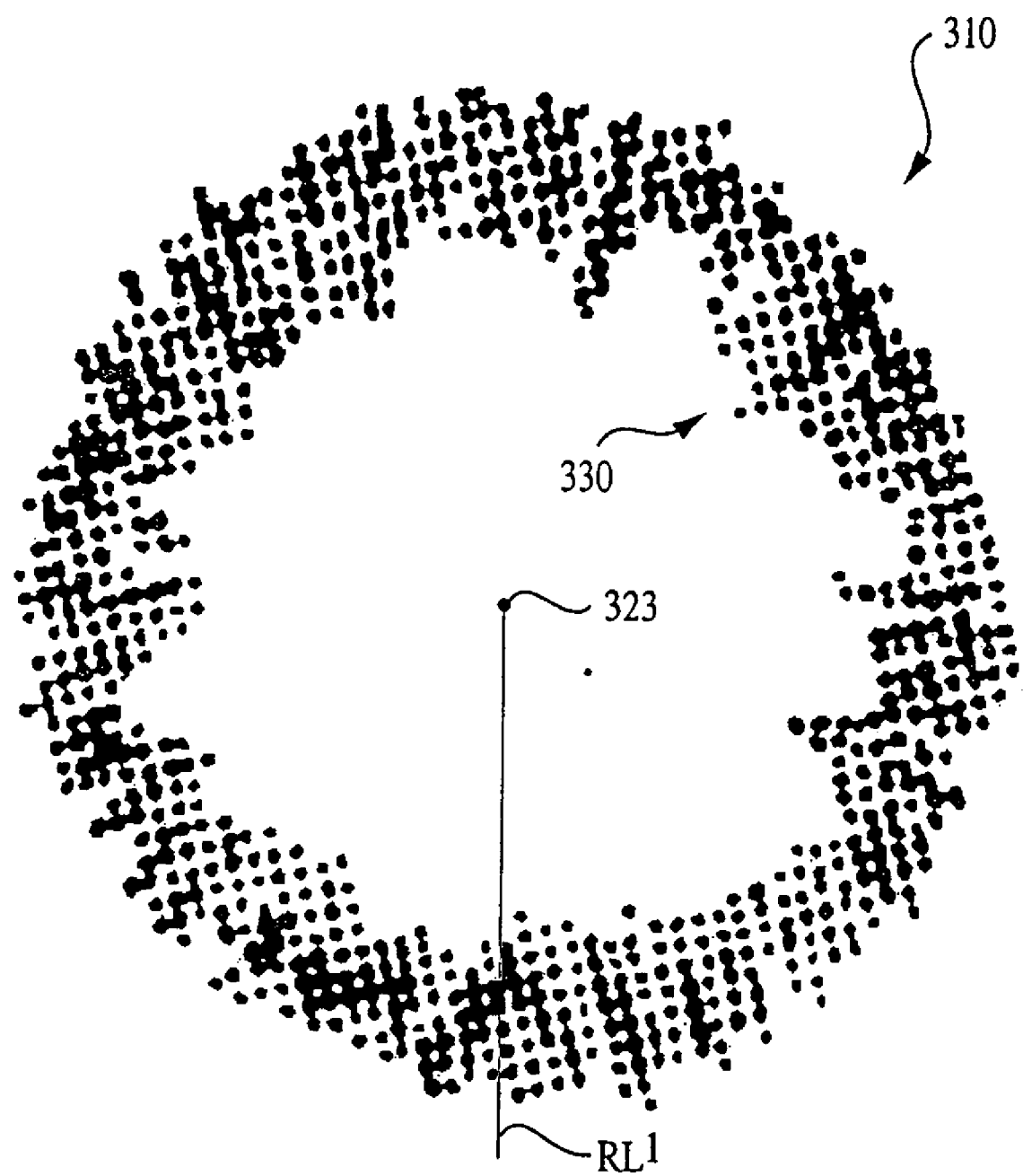
FIG. 3 illustrates a prior art color pattern overlay for a contact lens for an outer iris portion.

An exemplary description of the multiple patterns and colors that may be arranged in overlapping fashion to produce a more realistic lens is shown in U.S. Pat. No. 5,414,477 to Jahnke and owned by the Wesley-Jessen Corp., which is the assignee of the present application. The disclosure of the '477 patent is incorporated by reference into the present application. FIGS. 2 and 3 herein, which are taken from the prior art '477 patent, illustrate these overlapping patterns. As shown in FIG. 2, a first pattern element having a first shaded color is preferably located on the inner portion of the iris section 221. A jagged border is located on the annular portion in the outside of the pattern elements 210 and comprises spiked portions 224, valley portions 225 as shown. The pattern elements of FIG. 2 may be overlapped so that the center of the pattern element 310 is aligned over the center 323 of the pattern element 210 of FIG. 2. As shown in FIG. 3, the annular region 330 of the pattern element 310 contains a jagged border portion. Preferably, the pattern element 310 of FIG. 3 is colored a different or contrasting shade from that of the pattern element 210 of FIG. 2. When the two pattern elements are overlapped in this fashion, a depth of color and realism is achieved.

II. Custom Lens Ordering System Configuration

Figure 4:
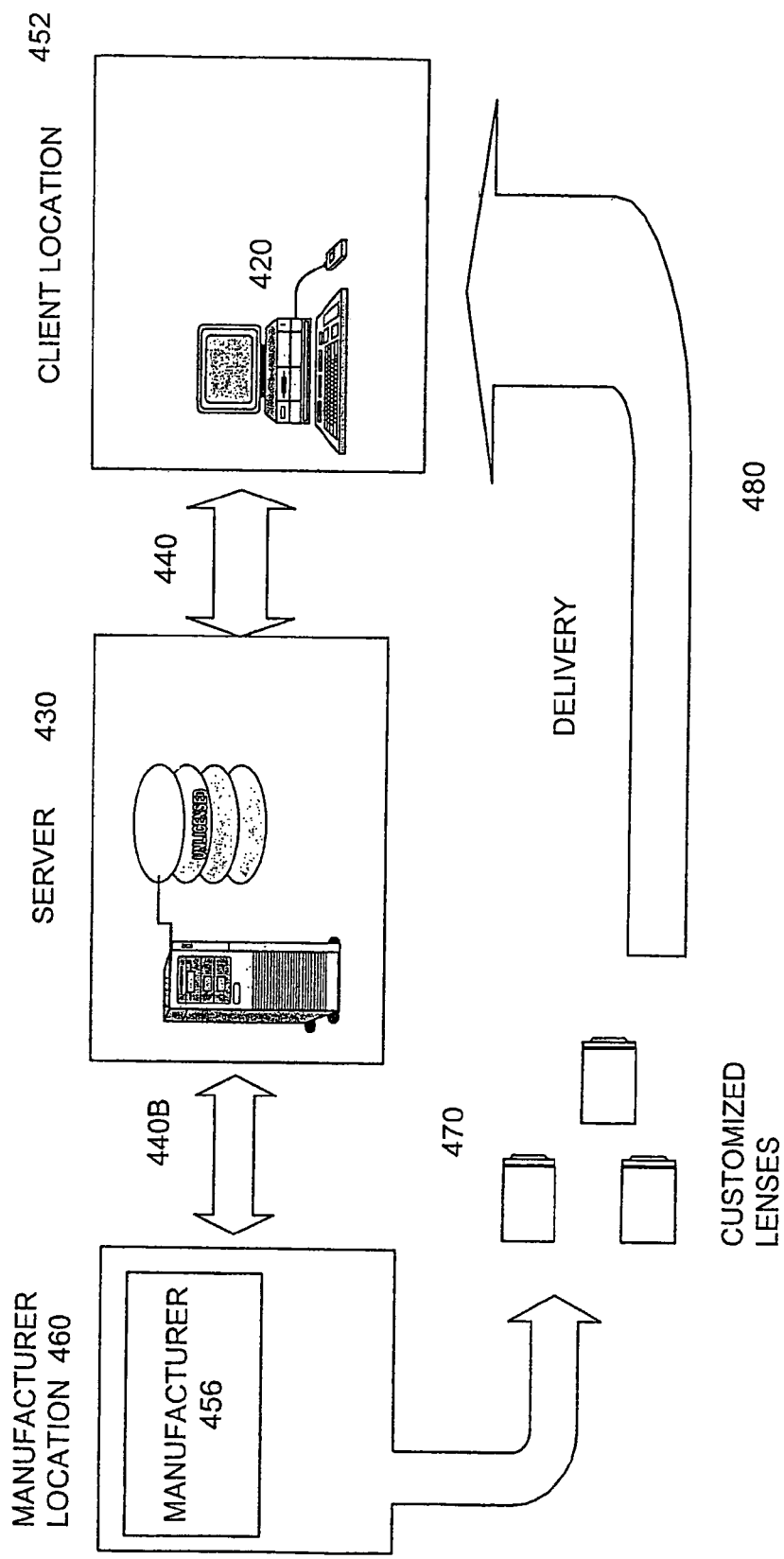
FIG. 4 is a block diagram illustrating an embodiment of the present invention.

FIG. 4 is a block diagram illustrating an overview of the method and system of a first embodiment of the present invention. As shown in FIG. 4, a client 420 and a server 430 operate via a communications network 440. The communications network may be a land-based telephone network, a conventional LAN network environment or the Internet. The client 420 preferably includes a user interface 450 located at the client location 452. In the preferred embodiments, the server 430 is located remotely from the client location 452. Preferably, the server 430 is in turn preferably linked via a communications link 440 a to a prescription verification server 454.

Preferably, the server 430 is linked via the communications network 440 to a manufacturing facility 456. Thus, the server 430, the manufacturing server 456 and the prescription verification server 454 may be located remotely from each other or at the same location. Preferably, the manufacturing location 460 includes server 456. Customized contact lenses fabricated to the client's specifications may be produced at the manufacturer location 460 as shown. Using conventional delivery methods 480, the finished customized lenses may then be delivered back to the client location.

Thus, in the preferred embodiments of the system 400 of the present invention, a user 410 at the client location 452 may specify customized contact lens parameters by using a user interface 450 to select customization parameters for client 420 via the processing server 430. The processing server 430 checks various databases to verify client and user information and checks the prescription verification server 454. Once the proper approval verification is obtained by the server 430, the order for the customized contact lenses is sent via the network connection 440b to the manufacturing server 456 at the manufacturer location 460. The lenses are fabricated at the location 460, and the finished customized lenses are delivered back to the client location 452.

Figure 5:
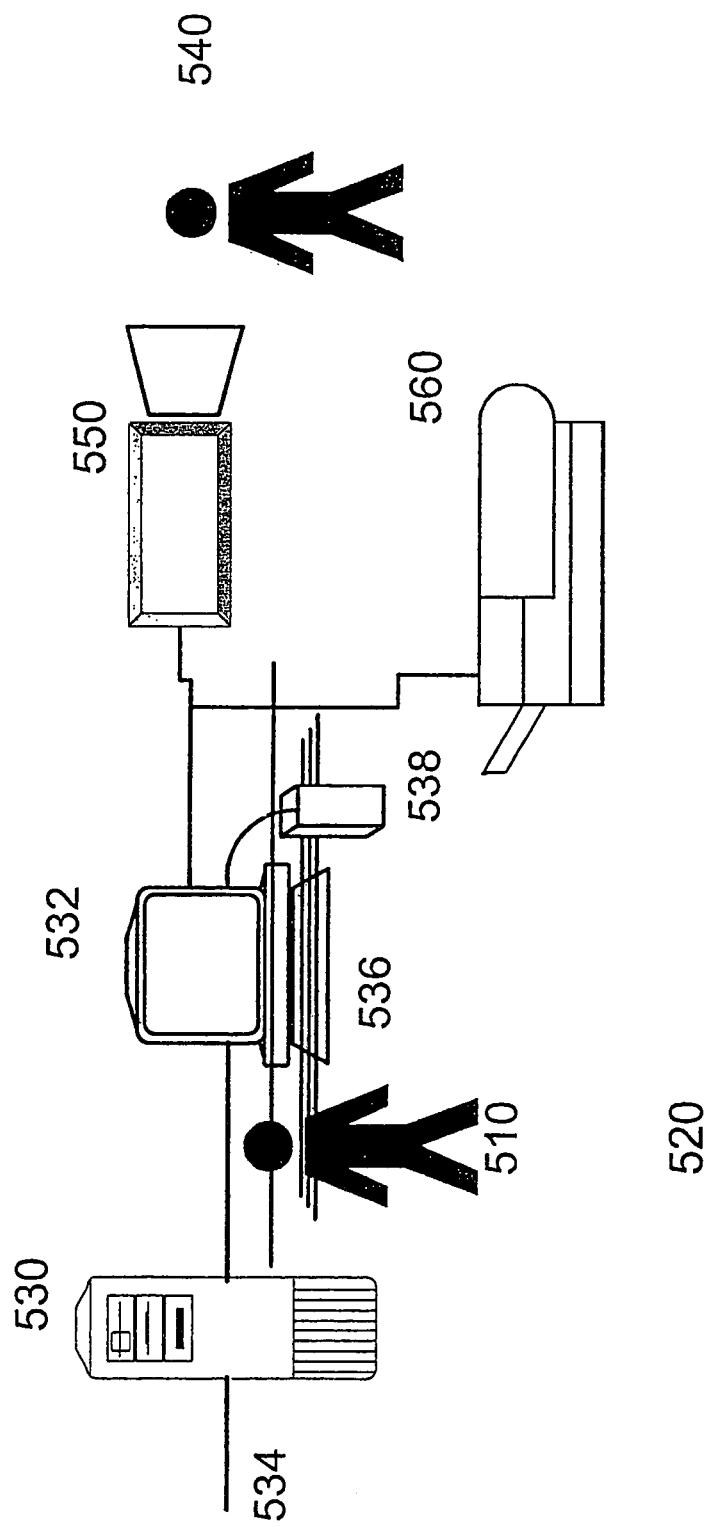
FIG. 5 is systematic diagram illustrating a portion of an embodiment of the present invention at a client location.

FIG. 5 is a block diagram of system components preferably present at the client location 452 of FIG. 4 in an embodiment of the invention. As shown in FIG. 5, a user 510 may use a plurality of user interface means to provide an active rendering of the customized contact lenses desired before committing the lenses for fabrication. A primary user interface 520 is preferably provided that includes a client system terminal 530 linked to a visual display 532. The client 530 preferably comprises a personal computer such as a Microsoft Windows-based PC having a local hard drive, microprocessor, and resident memory capacity. Of course, those skilled in the art will recognize that a wide variety of terminals may be utilized for the client 530, such as Windows NT®-based terminals, UNIX-based terminals, or Apple Macintosh® systems. Palm®-based handheld computers, or handheld computers running other operating systems, may be particularly useful in conjunction with the client 530 or for use as the client 530. The visual display 532 may be a conventional CRT video monitor, preferably with the capacity to show a wide range of accurate colors at high-resolution. Such monitors are also well-known in the art.

Preferably, the client 530 includes a network interface link 534 to provide a connection to the Internet, local Internet service provider, a local area network, or other connection link to the processing server 430. Exemplary network connections 534, which are in turn linked to the network 440 as shown in FIG. 4, may be land-based telephone lines that provide links to the Internet. Other links may include T1, T3, ISDN or other links to Internet or network service providers. Note that other links may be provided for wireless connection to Internet service providers or for shorter links between the client and a handheld terminal.

The user 510 may input text or select menu items by operating one or more user input devices for the client 530, such as a keyboard 536 or mouse 538. Other input devices, such as touchpads, touchscreens or numeric keypads may also be utilized. It is important to note that the user 510 may be a doctor, optometrist, clinician or service technician who is trained to operate the client 530 for a patient 540. In the present embodiment, the patient 540 is the subject that will wear the customized contact lenses made in accordance with the present invention. Of course, another embodiments, the patient 540 may operate the client 530 on his or her own, thereby becoming the same person as the user 510 shown in the diagram.

In the preferred embodiments, the user 510 and the patient 540 may view the customized contact lenses as various parameters for the lenses are selected via the display 532. To provide a more realistic and cosmetically accurate representation of the customized lenses to the user 510 in the patient 540, the system 400 preferably utilizes an eye "template" that can show the patient 540 and user 510 how the contact lenses will look in the particular patient's eyes. Examples of such eye templates are shown in the drawings of FIGS. 6 and 7.

Figure 6:
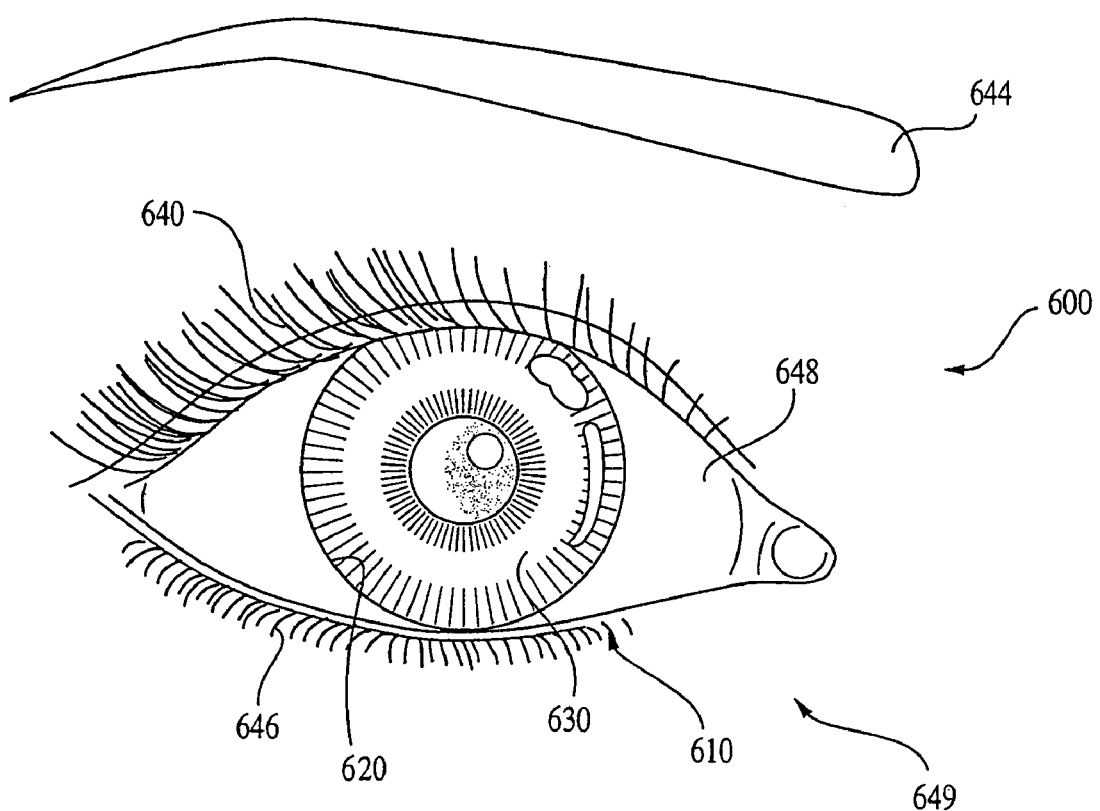
FIG. 6 is an illustration of a first embodiment of an eye template as utilized in the present invention.

Turning now to FIG. 6, a photographic template image 600 of the eye 610 of the patient 540 is shown. Preferably, the image 600 appears on the user display 532 or other display means. The eye 610 in the image 600 clearly shows the iris portion 620 and the colored areas 630 of a colored contact lens in place over the iris portion 620. Note that the eyelid 640, eyelashes 642, eyebrows 644, lower lid 646, white eye portions 648 and the surrounding facial skin tones 649 are visible on the image 600. These other visible portions of the eyes' surrounding features may prove important to the user 510 and the patient 540 when selecting the parameters for a cosmetically pleasing customized contact lens. In the alternative, the complete face of the patient 540 may be shown, and the user interface may allow the patient to manipulate makeup features such as lipstick, blush, eyeliner, etc. This allows the patient to see the selected lenses in varying facial environments.

Figure 7:
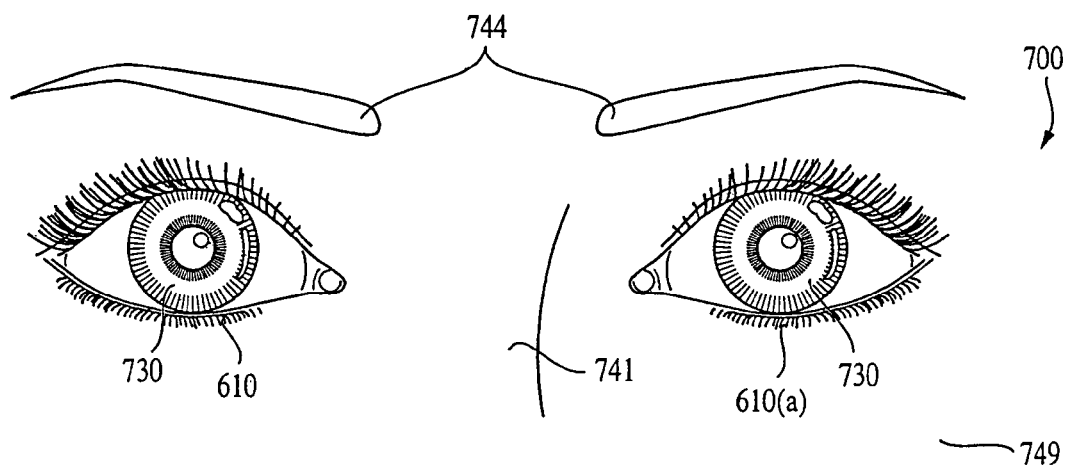
FIG. 7 is an illustration of a second embodiment of an eye template as utilized in the present invention.

FIG. 7 shows an additional embodiment of a photographic template image 700 of both eyes 610 and 610a of the patient 540. Note that in the present image 700, more of the patient's skin 749 surrounding the eyes is visible, including a greater portion of the nose 741 and both eyebrows 744. The image 700 used for the template is preferred, so that the patient 540 and the user 510 may view a more accurate rendition of the effect that the various colors of the contact lenses 730 will have on the overall appearance of the patient's face.

Referring back to FIG. 5, the various template images shown in FIGS. 6 and 7 may be obtained through a variety of image interface options. For example, to obtain the most accurate image of the eye area of the patient 540, a clinician or user can scan the patient's eye using an opthalmoscope connected to a digital camera 550. The camera 550 can be a standard digital still camera, videocamera or other standard camera imaging apparatus. Standard and widely available software such as Adobe Photoshop®, Adobe Illustrator®, Sigma ScanPro®, Media Cybernetics Image Pro®, UTH-SCA Image Tool®, or other software, for example, could be used to present the resulting image to the patient and user nearly instantaneously on the display 532 where alteration or enhancement of the patient's iris would take place. In the alternative, a scanner 560 may be linked to the client 530 to scan images of the patient 540 from photographs or other fixed images. In a further alternative, the client 530 may retain a database of sample eye templates. The user 510 and the patient 540 may thus scroll through sample images on the display 532 and select a template image that is suitable for the patient 540, either through closeness of the selected image to the patient's own eyes, or by selecting the eyes of celebrities, etc. As is known in the art, other image acquiring means or methods may be utilized to provide a template image to the client 530.

Figure 8:
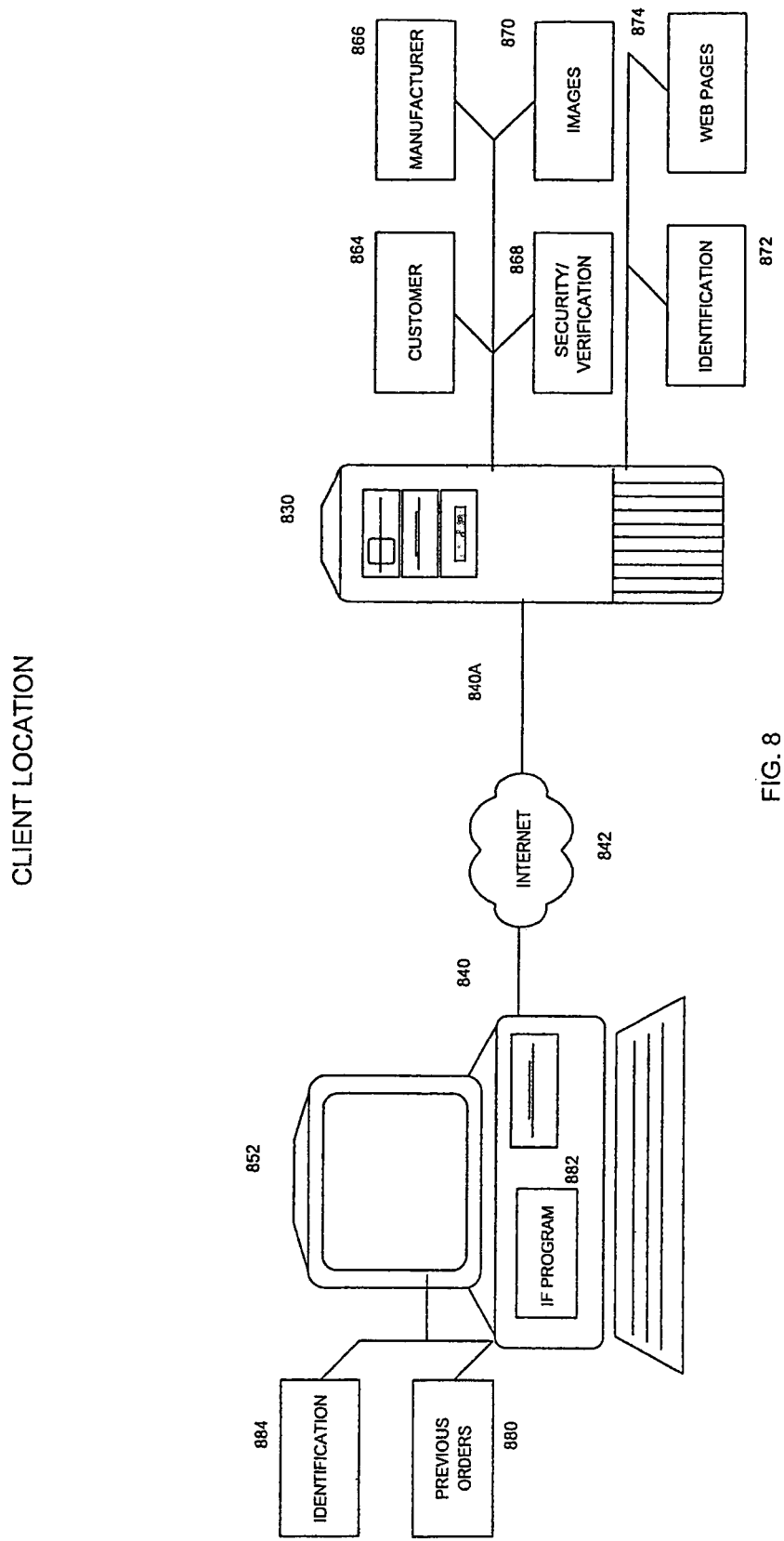
FIG. 8 is a block diagram illustrating a portion of the embodiment of the present invention.

FIG. 8 is the block diagram that illustrates an additional embodiment of the system of the present invention. In particular, the figure shows a server 830 and a client 852 preferably located at different locations. Preferably, the client 852 and other clients (not shown) are connected via communications links 40 to the Internet 842. The server 830 is in turn preferably linked via communications link 840(a) to the Internet 842. Preferably, the server 830 can serve a plurality of clients via the Internet and the World Wide Web.

The server 830 preferably includes at least one processor 860 and a plurality of databases 862 resident on the server and in communication with the processor 860. The databases include a customer database 864, a manufacturer database 866, a security and verification database 868, an image storage database 870, an inventory database 872 and a plurality of stored Web pages 874. Preferably, the server processor 860 receives requests in HTTP format for Web pages stored within the server 830. The Web pages are used to graphically present to the user 510 at the client 852 the various selection options, images, and ordering information used in carrying out the method of the present invention. The customer database 864 includes information specific to various users or patients. This information can include previous order information, prescription verification information, credit card or insurance information, and information relating to the patient's cosmetic characteristics and preferences. Of course, other information may be retained within this database to provide more convenient service for recognized customers or users on the system. The manufacturer database 866 includes information relating to various manufacturers of the customized contact lenses, including their inventory, production capabilities, and other information relevant to carrying out customized lens orders received from the client. The security and verification database 868 stores recognized user information such as passwords and usernames. Preferably, this information is linked to the customer database and associated with table items therein. The image database 870 includes stored images and patient eye templates for use in conjunction with interactive lens creation or selection. The inventory database 872 contains information related to lens availability in particular inventory facilities.

The client system 852 preferably includes a processor 880 which runs browser software such as Netscape Communicator® or Microsoft® Internet Explorer®. As noted previously in conjunction with the description of FIG. 5, the client 852 includes a local storage system in communication with the processor 880 for storing user interface software 882. Client identifier information 884, identification information for various patients and information identifying the particular client server 852 may be stored on the system. In present embodiment, therefore, the server 830 can communicate with the client 852 via the Internet 842 and communications links 840(*a*) and 840 using the client identifier information 884 so that the server 830 can identify the source of communications from the particular client 852. Furthermore, the server 830 can also identify and keep track of the ordering process with the client 852 via this identification information.

III. The Selection of Customizable Lens Characteristics

FIGS. 9 through 13 are flow diagrams of routines that enable the selection and ordering of customized contact lenses for Users in accordance with the present invention. When selecting the various customizable options for contact lenses, the user may, in general, follow at least three separate selection paths. When choosing which particular selection paths to follow, the user may evaluate skills such as whether lenses have been previously ordered using the method herein, whether the user is familiar with user interfaces or other computer environments, or simply whether the user has a particular contact lens configuration in mind when placing the order.

In the routines discussed below, in a preferred embodiment of the invention, the various integrated images are provided by the databases residing on the remote server. Preferably, the integrated and previewed images that are generated by the routines discussed herein are displayed in the form of Web pages sent via the Internet to the client reviewing them on the visual display 532.

Figure 9:
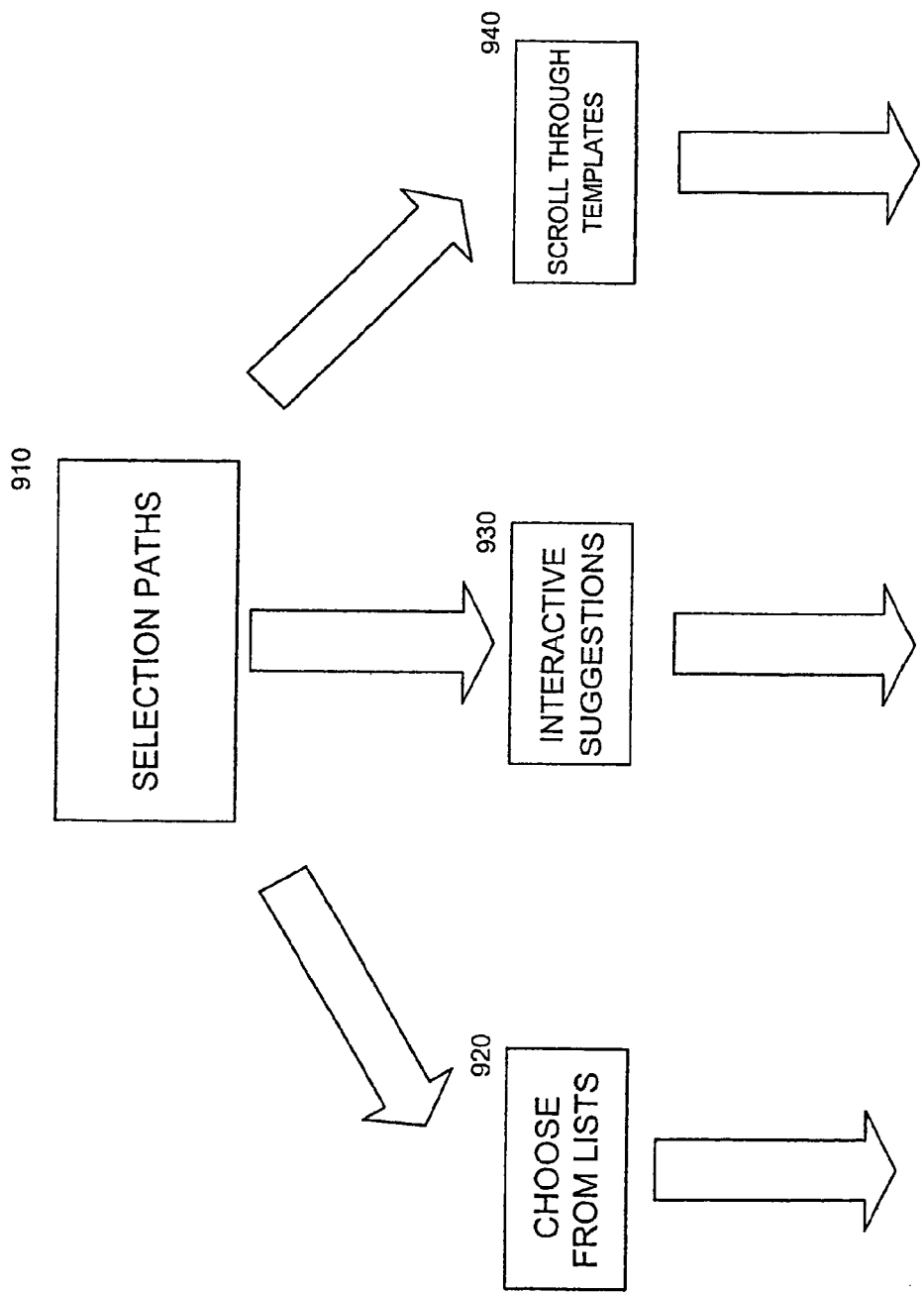
FIG. 9 is a flow diagram showing an overview of selection routines utilized in embodiments of the present invention.

FIG. 9 is a flow diagram illustrating the general selection paths 910 which may be taken by the user during the lens parameter selection processes described further below. At the juncture of every major selection of parameters in the preferred method, the user may either choose from a simple list of selections in step 920, proceed with an interactive suggestion routine to provide a more customized approach in step 930, or scroll through a plurality of pre-configured sample images incorporated into the user's eye template in step 940. In step 920, the user may simply choose from a presented selection of color, pattern or other lens parameter options. These options may or may not be presented along with images of these options. If the user decides to select such options, step 920 incorporates them into the user's template eye so that the user can view an image of the lens with the chosen option on the wearer's eye. Thus, the various presented options, as integrated into the template image, may be displayed to the user for evaluation. The interactive process of step 930 utilizes the various qualities associated with the user's template image (such as skin color, eyebrow and eyelash color, eye shadow color, hair color, lipstick color, blush color and natural iris color) to suggest intelligently the best color or pattern options. As will be described in more detail below, these suggestions may be based on stored associations, intelligent software routines or intelligent search agents implemented to search information on the Internet. In the alternative, the options may be integrated into the templates and presented to the user in a scrolled fashion so that the user may select the desired parameter in step 940.

A. Ordering Method and Processing Routines

Figure 10:
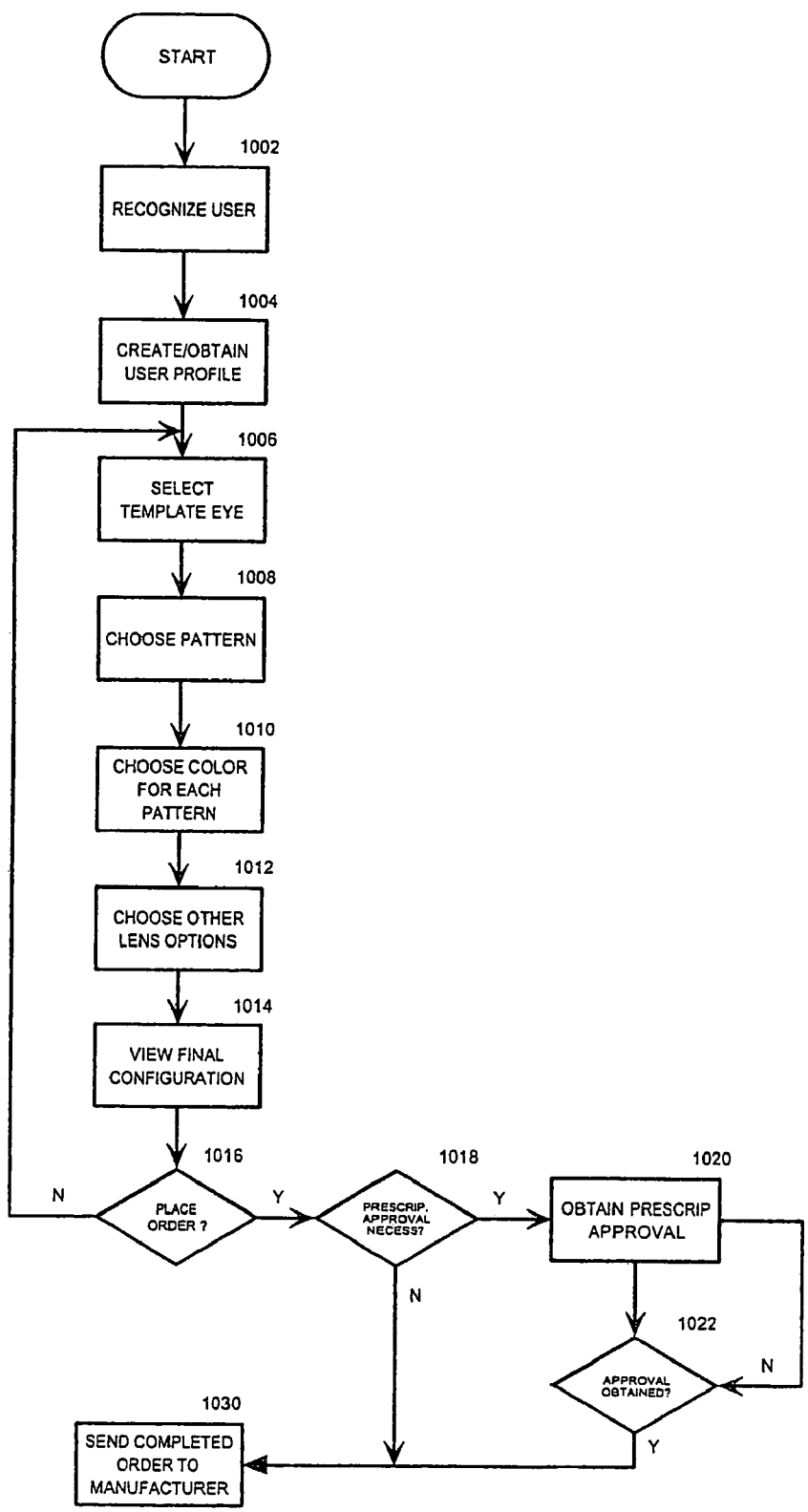
FIG. 10 is a flow diagram of a routine that enables a method of ordering a customized contact lens in accordance with present invention.

FIG. 10 illustrates a flow diagram of one embodiment of the customized contact lens ordering method of the present invention. The diagram illustrates an overall routine that may be implemented in software running on the server 430 or the client 420 as illustrated previously in FIG. 4. As noted above, the method or routine is preferably performed by a user working with the patient at the client location. At the client location 452, the client system 420 preferably communicates with the processing server 430 via the Internet. At step 1002, the routine checks resident databases either at the server or the client to determine whether it recognizes the user and/or the patient from previous orders or registered account information. In step 1004, if the user is recognized by the server 430, the appropriate patient profile is retrieved for use in assisting the client and patient with the order. If the profile of the patient is not available, or if the patient is a new user, a subroutine may be executed to create a new user profile for the patient. Preferably, the patient profile selected in step 1004 will include sizing and corrective prescription parameters that are necessary for the proper, medically safe fitting of the resulting contact lens. These prescription parameters may include options such as lens magnification, the presence or absence of astigmatism correction, the lens diameter, and the base curve of the lens.

In step 1006, the template eye is selected by the patient. The patient can select either photographic template eye images or provide scanned images of the patient's own eyes in accordance with the system described in conjunction with FIG. 5 above. In step 1008, the patient may choose the desired iris pattern layers for each contact lens that is positioned over the eye template selected in step 1006. Preferably, as each pattern is selected in step 1008, the pattern is automatically adjusted to fit the template and is shown to the user integrated with the template eye so that an accurate rendition of the patient's eyes wearing the contact lenses may be reviewed as options are selected. In step 1010, the user may choose one or more colors to integrate into the pattern chosen in step 1008. The colors may be presented in the form of a palette, color patches, or as pre-colored patterns presented to the user for selection. As with the previous steps, after the image and color are properly adjusted for fit and realism of rendition, the user and the patient can review the selected colors integrated with the chosen patterns from step 1008 on the patient's template eye. Finally, in step 1012, the user/patient may choose other options for the customized contact lenses. These options include color intensity, corrective prescription changes, tinting, or even the selection of pre-designed images for integration into the iris area of the contact lens. In step 1014, the user may view the final configuration of the lens on the template eye including all of the parameters selected for the template in previous steps 1006 through 1012. The user may further view other options, such as comparing various alternative options with the final configuration, or comparing the final configuration to the natural eye color of the user as shown in the template eye. It's important to note that the presently described method steps need not necessarily occur in the described order. For example, particular color patterns may be chosen before or after other lens options, and viewing of lens configurations may be made at any time.

In step 1016, the user is asked to confirm the approval of the order to queue the lenses for ordering and fabrication. At this time, the user may be prompted to enter payment information and the quantity of lenses to be ordered. This information previously may have been entered in connection with previously created user profiles. If the order is not confirmed at step 1016, the user may be brought back to the start of the selection routine at step 1006 and given the opportunity to change any of the selected parameters to the user's or patient's liking. If the order is approved by the user, the routine determines in step 1018 whether prescription approval is necessary to process the order. Prescription approval would be necessary if, for example, a new user orders a lens with a corrective prescription, the user's prescription has changed, or if any prescription-related parameter has been changed since the last prescription approval was performed. If in step 1018 the routine determines that prescription approval is necessary, prescription approval is obtained in step 1020. If the user and patient are at the same location, and the user is a certified optometrist or ophthalmologist, the user himself can approve the order immediately. Otherwise, prescription approval may be obtained by sending for approval by telephone or message to the certified optometrist or ophthalmologist listed in the patient's user profile. If the prescription approval was denied in step 1022, other attempts to obtain prescription approval may be undertaken in step 1020. Such steps can include revising the order, conferring with the physician, or setting up an appointment for consultation with the physician. If approval has been obtained at step 1022, or if prescription approval is not deemed necessary at step 1018 of the routine, the completed user's order for contact lenses is sent to the manufacturer in step 1030. In the alternative, the order may be sent to a peer for further approval and tracking, or to any number of other intermediate entities, such as a marketing or consumer tracking service. Furthermore, instead of sending the lens order to a manufacturer, the order may instead be sent to a clearing house, inventory service or lens ordering service which can process the order and interface with a variety of manufacturers or suppliers to obtain the necessary product.

Figure 11:
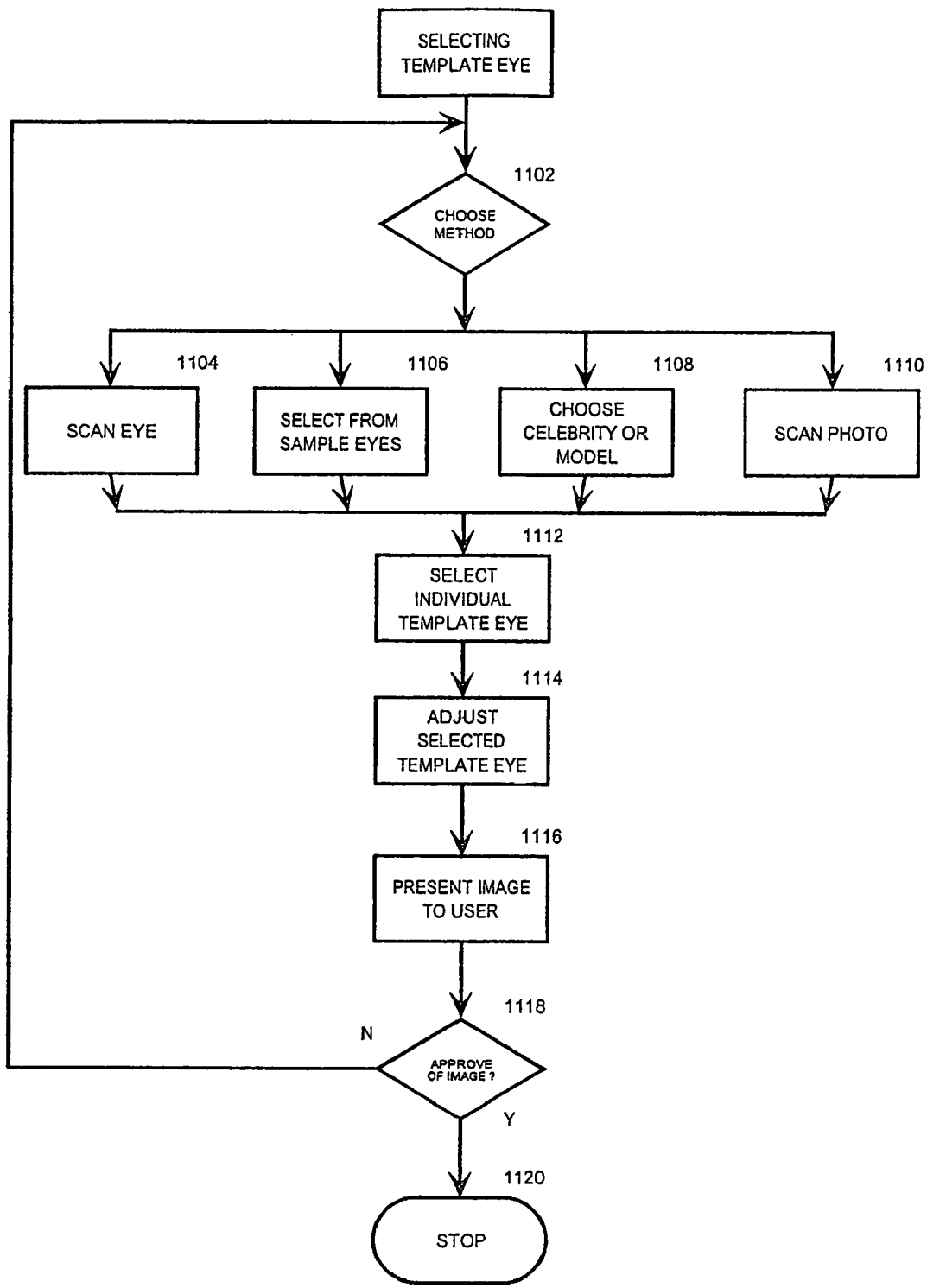
FIG. 11 is a flow diagram of a routine for selecting an eye template as utilized in an embodiment of the present invention.

In FIG. 11, a flow diagram is shown illustrating a routine that processes the selection of the eye template for use in the embodiment of the present invention. This routine is shown in the overall method of FIG. 10 in step 1006. In step 1102, the user chooses the method by which the eye template is selected. As described above, a variety of methods may be chosen, such as directly scanning and digitized in the image of the patient's eyes at step 1104, choosing the template high from a palette of sample eyes at step 1106, choosing from a selection of celebrity eyes at step 1108, or scanning and digitizing a photograph or other pre-printed image of an eyes at step 1110. Once the method of choosing a template eye is selected, the user selects the particular template eyes in step 1112. Once the particular template eyes are selected, the routine adjusts the size, shape and other features of the eyes, particularly with respect to the enhancements and accuracy of the iris portion. In this way, the pattern and color overlays which will be integrated into the image will be shown as accurate representations of the way the finished contact lenses will look while being worn by the patient. In step 1116, the adjusted template images are presented to the user, preferably via the visual display 532. In step 1118, the user is prompted to approve the eye template image that has been selected. If the user does not approve the image, the routine repeats. If the user approves of the eye template image, the routine ceases at step 1120.

B. Routines for Facilitating the Selection of Customization Lens Options

Figure 12:
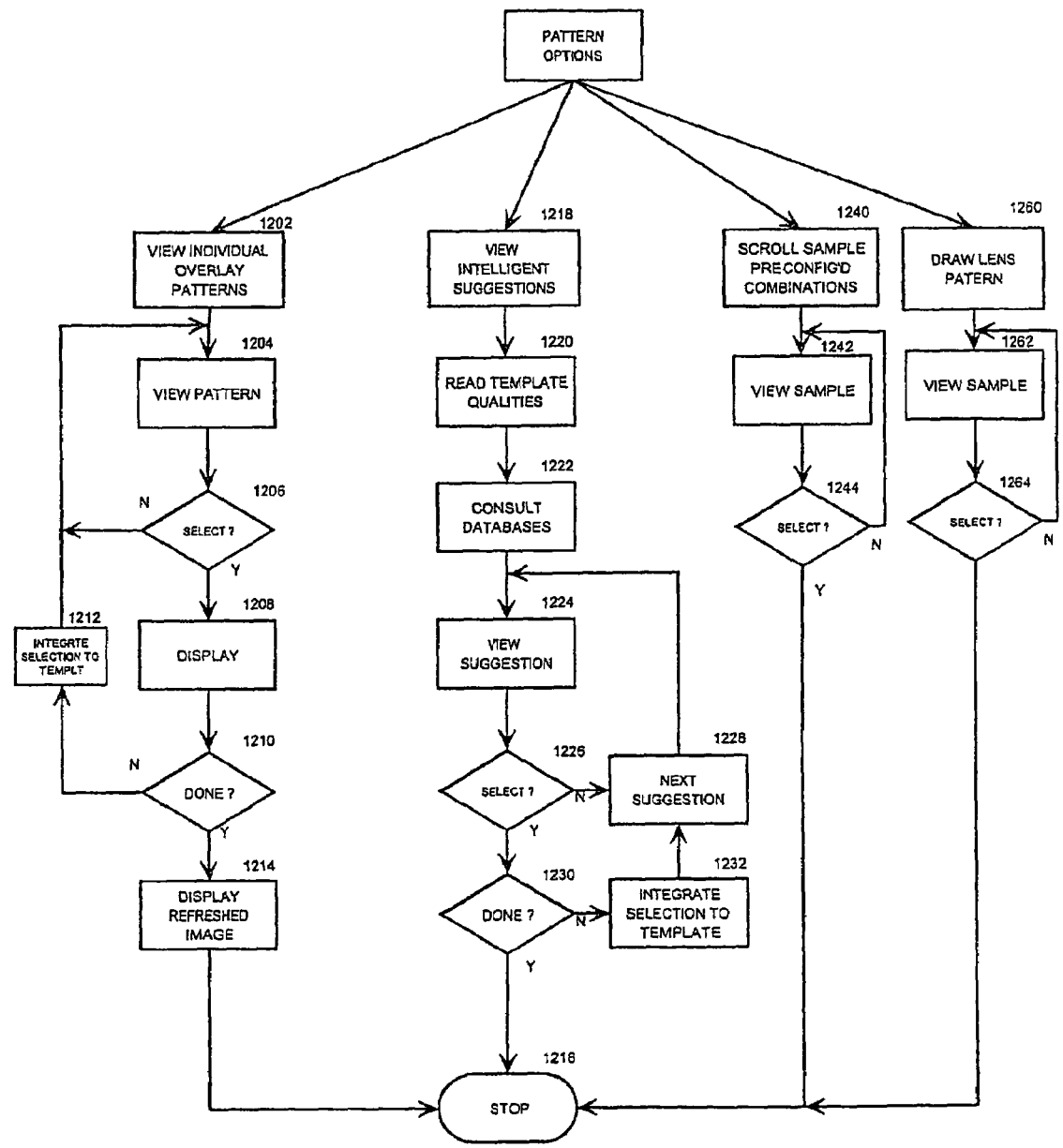
FIG. 12 is a flow diagram of a routine for selecting pattern overlays for contact lenses.

FIG. 12 is a flow diagram of the routine that processes the selection of pattern options by the user in a preferred embodiment of the invention. The routine may be utilized in conjunction with the flow diagram of FIG. 10 described above. When selecting patterns for the user's customized contact lens, the user may proceed in at least three separate ways as noted above in FIG. 9. First, the user may view individual patterns applied incrementally to the user's eye template in step 1202. In step 1204, the user is presented with the pattern options or a palette of available colorization patterns. In step 1206, the user selects one of the patterns that are presented. In step 1208, the routine displays the selected pattern from step 1206 integrated onto the image of the user's eye template. In step 1210, the user is prompted as to whether to add another pattern overlay to the eye template. If the user chooses to do so, the image selected in step 1206 is integrated into the template image in step 1212. Thus, subsequent overlay patterns chosen from the selection made at 1204 will be integrated with previously selected patterns on the eye template. Once the user determines that further pattern overlays are not desired at step 1210, the routine displays the final refreshed image of the user's eye template before stopping the routine at step 1216.

C. Intelligent Selection of Customizable Lens Options

1. The Use of Intelligent Routines

In the alternative, the user may request that the pattern options be selected via interactive suggestions provided by the routine beginning with the choice of the selection method at step 1218. In step 1220, the routine reads the various qualities of the user's eye template. These qualities may, for example, include skin color, true iris color and eyebrow colors. In step in 1222, the analyzed qualities of the eye template are matched with records in the database residing at the server. Suggestions for cosmetically appealing pattern variations are then made and shown on the visual display integrated with the eye template in step 1224. Preferably, the suggestions are made in accordance with cosmetically appealing options in light of the facial characteristics for "an estimated cosmetic effect" of the best or most cosmetically acceptable contact lens on the person or the eye template. In step 1226, the user may then decide whether or not to select the suggested pattern or combination of patterns. If the user does not wish to use the selected pattern, another suggestion is chosen at step 1228. If the user does select the suggested pattern at step 1226, the user may be prompted in step 1230 to indicate completion of the selection process. If not completed, further suggestions may be made in step 1228 after the selected pattern is integrated into the eye template in step 1232. Once the user determines that the pattern selection is complete in step 1230, the routine stops at step 1216.

Finally, the user may choose to simply scroll through a selection of random or complete pattern overlay combinations that have been found by intelligent agents, surveys or other information to be the most popular or cosmetically appealing combinations in step 1240. In step 1242, the user views the various preconfigured combinations and makes a selection at step 1244. The combination is selected in step 1244, and the routine ends at step 1216. In the alternative, as shown in box 1260, the user may manually draw via a freehand or object-oriented drafting interface, his or her own lens pattern for superposition onto a cosmetic contact lens. The user may view the sample image generated from the pattern in step 1262 and chose to select the pattern in step 1264.

It is important to note that in all of the previous embodiments, the user may also modify the eye template by using a variety of manual modification techniques with the aid of a mouse, lightpen, or other device. Manual modification methods include selecting a color and drawing on the template. Commercial computer programs offer a wide variety of drawing tools, some of which are designed to simulate a pen, pencil, airbrush, highlights, dotted lines, and erasures. Adobe Photoshop also offers the user the ability to create a custom pallet of brushstrokes that include adjustable diameter, hardness, spacing, and splatter patterns. Colors can also be customized by specifying and RGB or CMYK values, or by clicking on a color space.

Manual modifications may also be performed with the addition of patterns that are provided by the system, such as those in FIG. 1, FIG. 2 and FIG. 3 discussed previously. For example, the user may wish start by incorporating an inner starburst (FIG. 2) into the template eye, selecting and incorporating a color for the inner starburst, followed by the modification of the middle section of the eye using a computer brushstroke technique, followed by the addition of a dark outer zone such as in FIG. 3. The user may then wish to add finishing touches to any part of the eye before sending an order for her custom contact lens.

Figure 13:
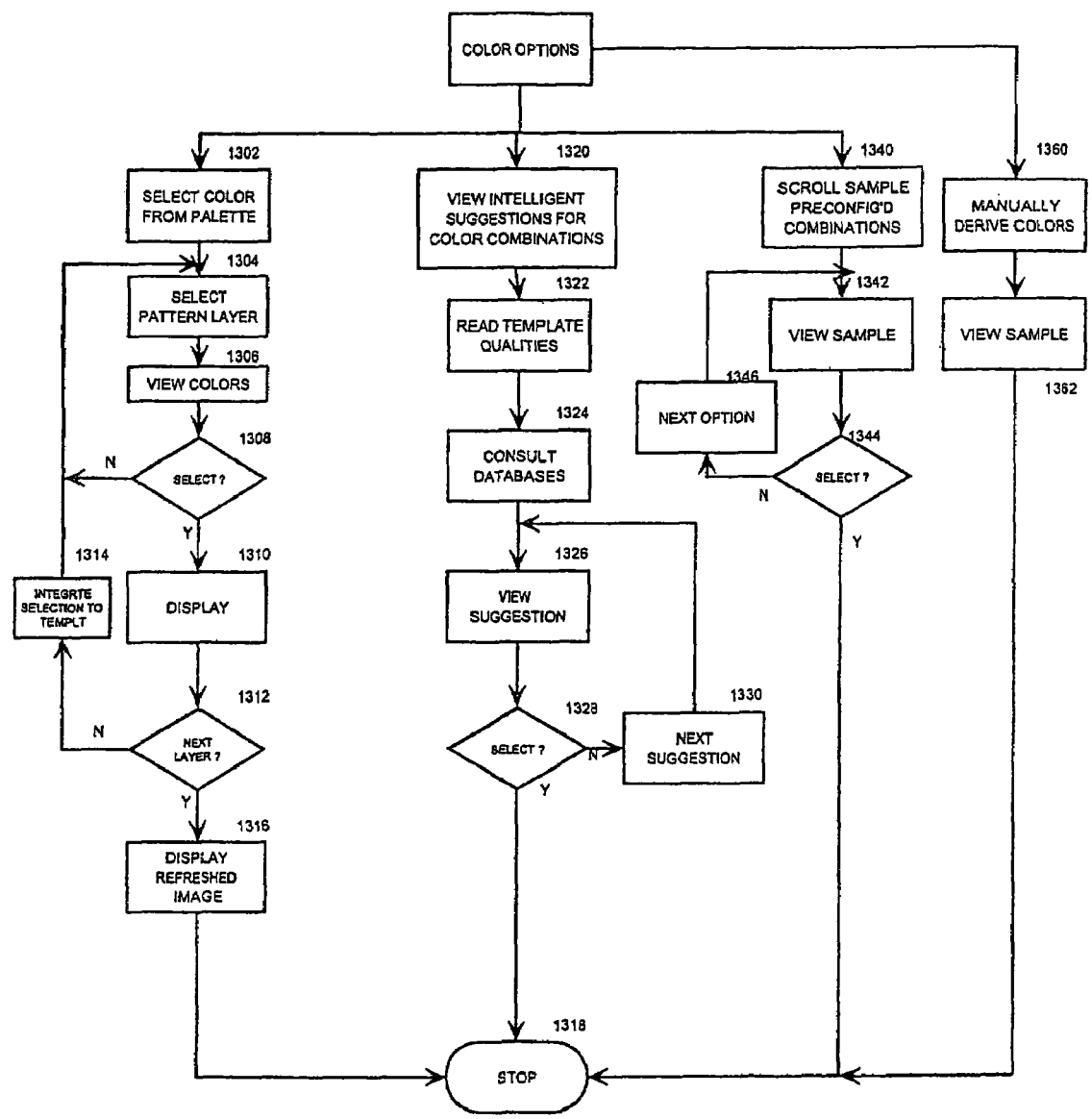
FIG. 13 is a flow diagram of a routine for selecting color options for the pattern overlays of FIG. 12.

FIG. 13 is a flow diagram of a routine that processes the selection of various color options for the selected patterns chosen in the routine of FIG. 12. Preferably, this routine may be utilized in the embodiment of the present invention shown above in FIG. 10. In the alternative, the selection of colors may be made in conjunction with the selection of patterns or within the same routine as shown above in FIG. 12. In step 1302, the user may choose to select color options from a palette of colors. The user begins in step 1304 by selecting the chosen pattern overlay layer to which the color selection will apply. For example, the user may specify that the color selection will apply to an inner-ring pattern for an iris such as that shown in the pattern of FIG. 2 above. Once the applicable pattern layer is chosen, the user may view the palette of colors in step 1306. In step 1308, the user may select the particular desired color from the palette. Once the color is selected, the routine displays the selected color integrated with the eye template in step 1310. If the user is satisfied with his selection, but wishes to continue choosing colors for other layers in the template, the user may choose to proceed to the next layer or pattern overlay in step 1312. In step 1314, the chosen color for the previously selected pattern layer is added to the template. The user may then select another pattern layer in step 1304 and continue cycling through the routine. If the user is satisfied with the color selections and does not choose to proceed to another layer in step 1312, the routine displays the refreshed template image in step 1316, thus displaying the eye template image with a fully integrated set of pattern layers having selected colors. The routine then ceases at step 1318.

The user may select in step 1320 the option of following interactive, or intelligent suggestions for color combinations for the previously selected pattern overlays. In step 1322, the routine analyzes the previously chosen pattern overlays in conjunction with the various color features and qualities present in the eye template. This analysis similar to the analysis undertaken in step 1220 in FIG. 12 above. Using these readings, the routine consults databases residing in the server in step 1324 to determine one or more suggested color combinations that the user may view in step 1326 and select in step 1328. As discussed above, the suggested lens color combinations preferably are based on the estimated cosmetic effect of the lens on the eye template, or various other facial features. If the user wishes to proceed through further suggestions, the routine will scroll through succeeding suggestions in step 1330. Once a suggestion is selected for coloring the pattern overlays, the routine may cease in step 1318. As a further alternative, the user may choose in step 1340 to simply scroll through popular colorization options which may be pre-chosen to be cosmetically acceptable when combined with previously selected pattern overlay combinations. In step 1342, the user may view the various pre-selected options, and the user may select options in step 1344. In step 1346, succeeding options may be selected for display. In the alternative, in step 1360, the user may manually create his or her own color for the chosen patterns by utilizing an RGB user interface control panel to readily mix colors for various multicolored palettes. In step 1362, the user may view the various created color options on the selected pattern overlay combinations, and the user may select further options in step 1362. After the selection is made, the routine may stop in step 1318. The selection of other options for the customized contact lenses as shown by step 1012 in FIG. 10 may be made in similar fashion to the selection routines as shown and described in conjunction with FIGS. 12 and 13.

2. The Use Of Internet-Based Information

The information used by the above routines is not restricted to information residing on the server. Information on the Internet, in particular the Web, may be searched by the preferred embodiments to supplement the database set(s) residing on the server of the preferred system.

One method of searching for information on the Internet involves the use of publically available search tools, or proprietary Web sites. Of the publicly available Internet search engines, those with the highest profile include AltaVista (www.altavista.digital.com), Lycos (www.lycos.com), Yahoo (www.yahoo.com) and Infoseek (www.infoseek.com). In these systems, keywords are typed in by the user and through various search tools and databases and analyze the results for information that may prove useful. When a user performs an Internet search using a particular tool, the query is actually made against the index that the tool has built and maintained over time. Most indexes record only a small portion of the information found in the actual Internet site. Some search tools limit themselves to information contained in the site's first page. Others will only index words appearing in the first paragraph. Still others record only the titles of major sections.

Given the increasing amount and complexity of information on the Internet, coupled with the increasing value of such information, the need to automate the searching of and analysis of recovered Internet information has been recognized and can be used to assist in the implementation of Internet search capabilities with the preferred embodiments herein. One solution to this problem is the employment of user interface intelligent computer agents that can simplify and automate the exploitation of the Internet by Internet interrogation processes and the translating of information on the Internet from computer-readable to human-readable format. These types of programs are given names such as robots, wanders, spiders or crawlers. They act as "automated browsers," requesting and archiving data for later use, either by the server routines of the preferred embodiments herein or by the user directly.

3. Intelligent Agents and Bots

Figure 14:
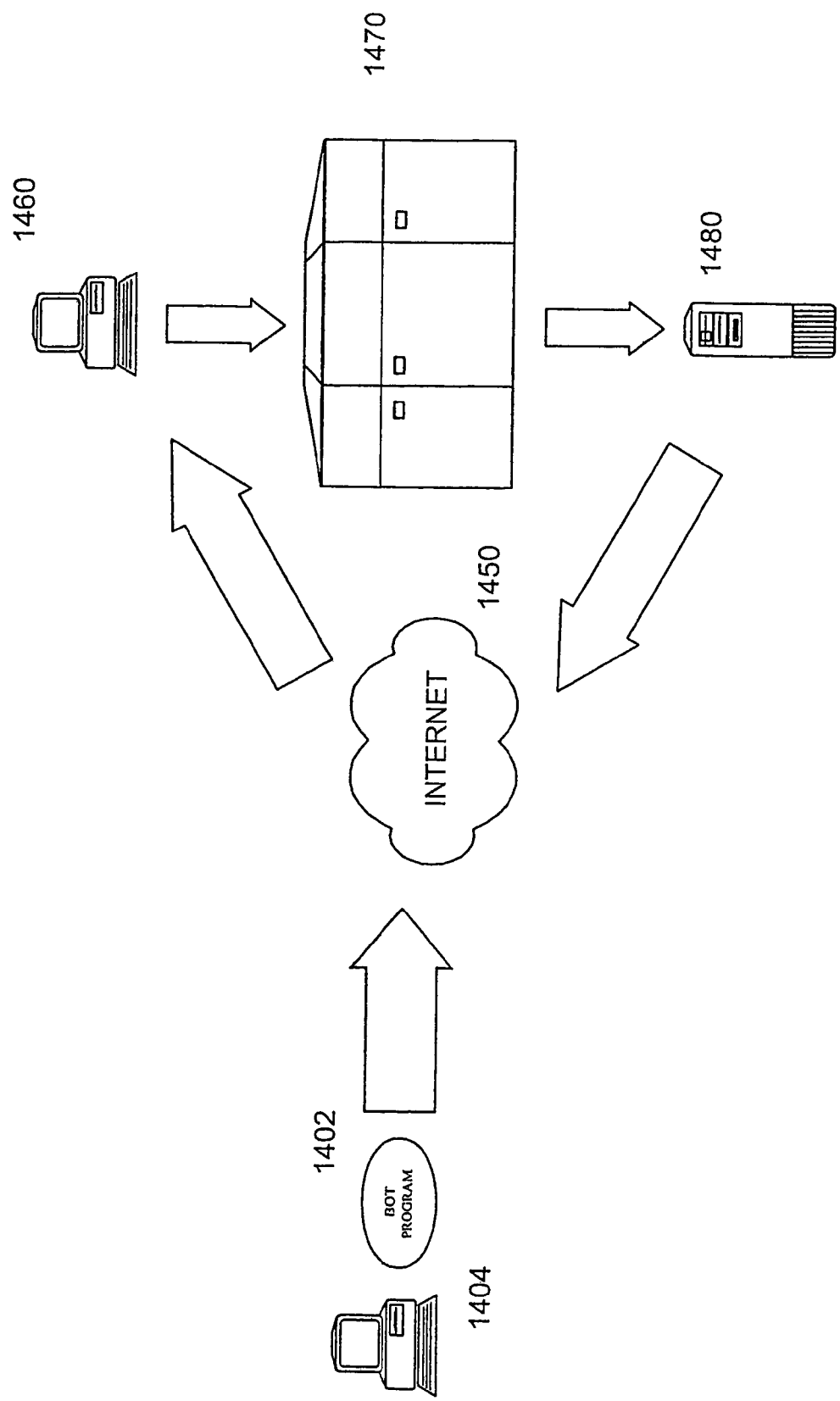
FIG. 14 is a block diagram illustrating an overview of the environment that may be utilized by a "bot" program that may be implemented into the present invention.

Intelligent agents, or bots (short for "robots"), have the capability to automatically scan the Internet on a continuous basis for new information, enabling users to specify the types of information they wish to follow on an ongoing basis. As shown in FIG. 14, a bot program element or module 1402 may reside at a client base 1404. From the client 1404, the bot 1402 can scan the internet 1450 or other clients 1460, 1470, databases or servers 1480 and return to the client 1404 to report or collect its found data. The intelligent agent can monitor events in real-time and notifies the user when something has happened that matches their submitted pre-established criteria. Most of the major Internet search tools now offer some intelligent agent capabilities.

The intelligent agent exhibits aspects of the mind (e.g., intelligence) in performing its tasks, and acts independently on behalf of its owner. Agents are viewed as autonomous—they can make decisions while working toward a goal. Ultimately, agent technology will help individuals and corporations cope with information complexity. For example, agents are suited to the administrative tasks associated with a large network, such as collecting hardware and software inventories, distributing software and selectively taking backups. Agents can also find information and applications, shop for the best price on a product, and orchestrate events (e.g., order flowers or deliver a message).

Agents come in different types and varying capabilities. One method of classification is their "sense of agency." Weak agency implies capabilities such as autonomy, socialization (communication with other agents), reactivity (events, stimulation), proactivity and programmability. Strong agency, more closely aligned with traditional artificial intelligence (AI), includes the characteristics mentioned above plus more "mental/humanistic" qualities, such as knowledge, beliefs, intentions and even emotions.

Web robots are normally stationary programs that operate from a specific machine. For example, in the preferred embodiments above, in FIG. 4, can reside on the server 430, or server 830 in FIG. 8. These robots connect to remote Web sites in the network and constantly search for information. While these programs can be directed to a list of one or more sites, often they "crawl" through the network instead. For example, a robot may begin at an explicitly defined site and download a server's default (HTML) page. From there, the "bot" proceeds automatically by examining the first document. The robot then discovers links to other pages and sites (i.e., URLs) and then downloads more pages. More sophisticated intelligent agents have the capability of traveling from machine to machine, returning to the machine that requires the presentation of what the bot has accomplished.

Web robots perform several tasks when acting as agents. They can index, format and archive information gathered from the network, search for obsolete pages and sites or gather statistics about the network itself. The information can then be used by a client or server-based program and presented to the user.

Agents that are mobile may in some instances be more advantageous than stationary agents. Mobile agents have the following benefits:

1. Process Closer to Resources: This reduces network traffic and improves throughput. Rather than sorting a large database through the network, for example, the search could be conducted locally.
2. Minimizes the Damage of Network Outages: Once an agent reached a location it could work for extended periods of time, unaffected by network disturbances around it.
3. Workload Distribution: Since agents are programs, distributing them in a controlled manner helps balance the overall workload.
4. Software Distribution: Agents can deliver software upgrades via the network.

4. Marketing and Commerce Implementations of Intelligent Agents

In order to secure a transaction, bots may require currency and the authorization to spend money. There are several methods for bots to handle this requirement. One method is for bots to have secure "e-wallets," containing virtual money, that will be carried by bots. The digital currency is used to complete customers' purchases. Information about digital cash and electronic wallets may be found at (www.e-wallet.com).

In conjunction with the presently described embodiments, a user who frequently purchases contact lenses on the Internet may utilize digital cash accounts and electronic wallets such as those described above to purchase contact lenses. In the embodiments described herein, these digital accounts may be automatically debited or supplied with rebates or discounts automatically depending on various frequent purchasing configurations, promotionals or other advertising initiatives.

5. Preventing Intelligent Agent Overreaching

Autonomous, intelligent agents may cause several problems on a network. Web servers can be overwhelmed by aggressive robots, where each robot fires requests in rapid succession. To help control robot behavior, a set of voluntary design guidelines has been established, with the following four primary directives:

1. Show Identification: Robots can be identified by specific HTTP request headers sent to the server (From, Referer, User-Agent).
2. Reduce Resource Consumption at Server: Use techniques like limiting the amount and type of data requested, or pacing the requests.
3. Report Errors: Errors encountered by the robot, including dead-end links, should be reported to the site's webmaster.
4. Conform to the Standard for Robot Exclusion (SRE): The essential function of SRE is to protect a Web server by restricting access to all or part of its files. The SRE protocol requires support of both the robot author and a site's webmaster.

SRE works as follows. First, the site administrator creates a set of definitions and places them in a file available to incoming robots. When a robot accesses a site, it first must download and decode that file. The definitions are interpreted sequentially, essentially declaring which robot or robots are restricted and not allowed to access specific directories at the site.

The desire for security and privacy can lead to markets for "trust." This function addresses the needs of both buyers and sellers of services. One dimension of privacy issues is economic in nature; in that some consumers can "sell" their data to vendors and "infomediaries" in exchange for services or goods, while others who desire more privacy can elect to have limited participation in the market.

b. Agent and Bot Development Languages

The development language for implementing intelligent agents and bots selected must be widely supported, not only by general-purpose operating systems such as Unix or Windows NT, but by any device with a microprocessor.

Two application-layer protocols are also chosen to enable mobility so that agents can safely move from machine to machine. Associated with this type of transfer protocol are other supplemental programming to enable, including network security-encryption, authentication and agent identification. Several experimental or prototype agent languages have been developed, which fall into the category of Agent-Oriented Programming (AOP). Under such regimes, agents are viewed essentially as objects with specific enhancements, such as mobility, knowledge and awareness, and the ability to exchange messages. Several proposals for a universal Agent Communication Language (ACL) have been put forward to standardize messaging among mobile agents. The federally funded ARPA Knowledge Sharing Effort leads the way with two major standards designed to represent and share information—Knowledge Query and Manipulation Language (KQML) and Knowledge Interchange Format (KIF).

KQML allows each agent to represent a virtual view of its knowledge to the outside world. The agents can then exchange messages and attempt to query or alter each other's knowledge. The protocol defines operations and the format of the messages exchanged between agents. KQML forms a consistent interface between agents regardless of how each agent stores knowledge internally.

The Java language, created by Sun Microsystems, can be applied to the creation of intelligent agents. Java can easily be extended to allow a programmer to "plug into" optional capabilities in each run-time environment. Those creating Java-based agent technologies include FTP Software (Andover, Mass.), IBM and Stanford University. Java is object-oriented, and is compiled into processor-independent byte codes. These programs, held in "class" files, can then be moved through the network and interpreted at a target machine. Therefore, Java is first compiled and then interpreted. In addition to its mobility, Java offers broad support. Java programs can be used not only in browsers but also as a processor-independent language (develop once, deploy anywhere) and as the basis for the "network computer," that has been promoted and released by Oracle (Redwood Shores, Calif.), IBM and others.

An example of a functionally rich, commercially supported JAVA product is CyberAgent from FTP Software. CyberAgent allows Java agent applications to be created through tools and additional classes, and then to be selectively launched into the network.

C. Hardware and Software Tools for the Development of Bots

When designing an intelligent agent for a given range of applications, the following factors must be addressed:

Enabling the intelligent agent to interrogate and exchange information to and from the website or target;

Cyber-negotiating capabilities to provide the agent with negotiating mechanics and strategy;

The traveling of the agent from one website to another. A Meeley or Moore state machine is one general solution to this problem; and Presentation of the results of the agent's activities to the entity interested in receiving the results.

IBM alphaWorks (www.alphaWorks.ibm.com) has made available two new Java tools in XML messaging and intelligent software for developer feedback—SOAP for Java Q and ABLE. SOAP for Java Q XML-based messaging technology is linked with other Internet standards and ABLE provides a framework and graphical editor for constructing intelligent software agents in Java. The SOAP specification defines a simple, Internet-friendly method of using XML to send messages and to access services. With XML and SOAP, each business can choose its own internal implementation technology, such as Enterprise JavaBeans, Microsoft's Component Object Model (COM), or traditional languages such as COBOL.

In addition to HTTP, SOAP services can be accessed through a variety of message transports. For example, bindings could be defined to IBM's MQseries, or to electronic mail messages (SMTP). SOAP data representations and structures have been aligned with the proposed W3C XML Schema language, and it is now possible to apply those encodings in a much broader range of message patterns (e.g., streaming, one-way, multicast, etc). Using SOAP, any business can access a service, such as a parts catalog, or send a purchase order, to or from any other business. SOAP simplifies the binding of the programming language or object system of the developer's choice. SOAP's built-in support for Remote Procedure Calls (RPC) also simplifies the use of methods on remote objects, using XML and HTTP, so developers can use SOAP to create distributed systems within their own organizations.

Other agent development tools include: Network Query Language TM (NQL(TM)), by AlphaServ.com, a development platform used for the creation of intelligent agent software for network management and e-commerce applications; INTEGRITY, enterprise intelligent software by Vality Technology Inc. (www.vality.com), allows companies to analyze, match and reconcile data and transform it into a strategic information asset; SST-Resource Availability Version 3.3, by SOFTWORKS Inc. (Alexandria, Va.; www-.softworks.com), proactively monitors storage resources across the enterprise and provide customers with the means to maximize storage utilization and business application availability; BroadVision One-To-One, a software application system and management tools for rapid development and real-time operation of one-to-one relationship management applications for large user and content databases, high transaction volumes, intelligent agent matching, and integration with existing business systems; and NeuroStudio from Neuromedia Inc. (San Francisco, Calif.; www.neuro-studios.com), a line of authoring tools and server software that enables non-programmers to create automated software agents that mimic human service representatives over the Web.

D. Shop Bots

Shopping robots, called "shop bots," are software agents used to search the Web for the lowest-priced products. Shop bots are currently used to find the lowest-priced products on the Web. In addition to price, shopbots may also evaluate several factors, such as product features, warranty, delivery time and return policy, as well as the power to complete transactions automatically. Agents may also find the best buys for users before they remember they need something. The Agent can automatically order cyclical cosmetics, toiletries, drugs, or groceries and have them delivered.

In addition, it is important to note that several auction sites are now available for online shopping, including Priceline.com, Amazon.com, Ebay, Dealtime (www.dealtime-.com), Bidder's edge (www.biddersedge.com) and Yahoo- .com. These sites, and others, can be searched or viewed to provide information relating to consumer demand, fashion trends or aftermarket sales activities.

From a presentation standpoint, the shopbot intelligent agent may also direct users to a site, or automatically produce a multimedia presentation that will strategically bundle the package of information in an engaging way, and the online decision support tool will persuade the person to buy.

E. Commercially Available Bots

Early attempts to create intelligent agents include Microsoft's "Firefly," wherein users fill out a profile about their likes and dislikes. A Firefly-enabled online storefront can keep track of a person's favorite authors, brands, birth date or anniversary. It may even know a person's favorite flower or perfume.

As an example, the intelligent agent technology in Movex® is designed to not only collect but also to communicate information among channel partners. A manufacturer, for example, can use the retailer's sales information to determine demand for some component of a retail product. Agents may also find the best buys for users before they remember they need something. The IA will automatically order cyclical cosmetics, toiletries, drugs, or groceries and have them delivered.

Continuous speech recognition, natural language understanding, problem solving and animated personalities are further enhancements to this technology, and may routinely assist with finding information, answering questions, and conducting transactions. An example of a bot with speech recognition capability is Artificial Life's SmartEngine® technology, which gives the bots the capability of behaving intelligently and communicating with Internet users in natural language. Because the bot will learn what customers have already bought and where their interests lie, it can address them actively with a specific objective in mind and recommend the ideal mobile telephone product.

Other popular shop bots include, for example, www.mysimon.com, Net-tissimo.com (www.net-tissimo.com), Universus by Geobot, Zegenie.com, Artificial Life Inc. (Alife.com), CyberAgent from FTP Software, Allaire Corporation's ColdFusion, and Net Perceptives Group Lens. Others may offer additional enhancements to the searching function. Intelligent agents are available in a continually increasing range of personality choices. Sapir's company uses bots with natural language comprehension technology to carry on a limited but functional conversation between a customer and the bot, represented on-screen as a character, or avatar, as it is referred to in the art. For example, Imp Character Technology enables creation of characters who offer easy and natural interaction through conversation and animated gestures, active assistance and other sorts of expertise and the color, warmth and entertainment value of distinctive character personas. By offering these compelling functional, human and social qualities, Imp Characters build multifaceted two-way relationships between a company and its customers. In hopes of enhancing the holiday online shopping experience, Extempo (www.extempo.com), a creator of interactive characters and intelligent agent technology, produces a variety of shopping characters, such as "Chat with Santa," a Santa Claus character for e-commerce Web sites.

F. Applications

In the context of the present embodiments, it is desirable for the present system and method to track customer attitudes, preferences and behavior, in both a static and dynamic sense. It is also important to determine what influences consumers and their cosmetic lens choices, and to what extent.

One efficient way to use pull technology to gather information on prospective clients involves the use of specialized databases. Searching a variety of databases often leads to the discovery of some "common ground" between the sales person and the prospect. For example, if a salesperson has knowledge of or personal contacts with the members of certain charitable boards, this can be all that is needed to establish a higher level of credibility. In addition, having detailed background data prior to an initial meeting with a prospective client makes a positive first impression and sets the salesperson apart from competitors who arrive with minimal knowledge and expect the client to bring them up to speed.

A virtual customer consultant is another potential application of intelligent agents. Bots can be integrated into existing Internet shops and advise customer and buyers on products, actively offering products in various Web shops. When necessary, the virtual customer consultant will pass the customer on to a live operator who then continues the sales discussion without interruption.

A person skilled in the art will appreciate that the method and system of the present invention may be utilized in environments other than the Internet. For example, the method may be implemented in conjunction with a local wireless radio network using handheld mobile units or computing devices. Other communication methods such as point-to-point connections, local area networks, wide area networks or combinations thereof may be used to implement the invention. Furthermore, the method can also be utilized in conjunction with electronic mail systems where in the orders and image templates may be sent back and forth between the user and a server. Note also that the server system 430 may include a combination of hardware and software to assist in providing interactive feedback for generating orders in response to requests from clients. In addition, other more traditional modalities may be used to implement or supplement the method herein, such as mail, telephone orders, magazine ads, and rebates.

Of course, it should be understood that a wide range of changes and modifications can be made to the preferred embodiments described above. For example, the method steps described above can occur in a different order than those disclosed. Thus, it is intended that the foregoing detailed description be regarded as illustrative rather than limiting, and that it be understood that it is the following claims, including all equivalents, which are intended to define the scope of this invention.

We claim:

1. A system for configuring a customized contact lens for a user, said system comprising:

means for selecting one or more sample eyes as a template eye and for displaying the image of the template eye to assist said user in visualizing selected options for a customized contact lens;

means for displaying a plurality of pre-configured pattern selection options to said user, selecting a pre-configured pattern, and superposing said selected pre-configured pattern onto a portion of said displayed template eye;

means for selecting one or more colors from a pallet of colors and coloring superposition areas of said selected pre-configured pattern with the selected colors to generate an image of a contact lens;

means for adjusting said pre-configured pattern and/or colors to generate an optimized image of a modified contact lens in accordance with the intentions of said user;

means for sending a request to order the modified contact lens incorporating lens characteristics selected by the user;

means for receiving the ordering request; and means for manufacturing the modified contact lens.

2. A system for configuring a customized contact lens for a user, said system comprising:

an image input device for obtaining a graphical template eye image from said user;

a graphical user display in communication with said device for visualizing said template eye image, said user display displaying a plurality of pre-configured pattern selection options to said user in conjunction with said template eye image;

a user interface linked to said display for selecting a pre-configured pattern to be superposed onto a portion of said template eye image and for selecting one or more colors from a pallet of colors to color the superposition areas of said selected pre-configured pattern to generate an image of a designed contact lens;

a server in communication with said user interface, said server receiving selections of said pre-configured pattern and color from said user interface and incorporating selected pre-configured pattern and color synthesized image for display, wherein the synthesized image includes the image of the designed contact lens superposed onto said template eye image;

a database accessible by said server containing information relating to said user and said available selectable pre-configured pattern and color; and a fabrication system in communication with said server for receiving information relating to said image of the designed contact lens and manufacturing a contact lens based on said information.

3. The system of claim 2 wherein said user interface further comprises a subsystem for deriving a contact lens pattern that, when worn, modifies the appearance of an eye according to the intentions of the user.

4. The system of claim 3 wherein said database further comprises information generally available over the internet, and said information being searchable by an intelligent agent originating from said server.

* * * * *